(12) United States Patent
Todokoro

(10) Patent No.: US 11,047,396 B2
(45) Date of Patent: Jun. 29, 2021

(54) BEARING PACKING AND FEED PUMP

(71) Applicant: AGATSUMA CO., LTD., Tokyo (JP)

(72) Inventor: Shinji Todokoro, Tokyo (JP)

(73) Assignee: AGATSUMA CO., LTD., Tokyo (JP)

( * ) Notice: Subject to any disclaimer, the term of this patent is extended or adjusted under 35 U.S.C. 154(b) by 61 days.

(21) Appl. No.: 16/432,282

(22) Filed: Jun. 5, 2019

(65) Prior Publication Data
US 2019/0383302 A1 Dec. 19, 2019

(30) Foreign Application Priority Data
Jun. 19, 2018 (JP) .............................. JP2018-115729

(51) Int. Cl.
| F04D 29/046 | (2006.01) |
| F04D 29/10 | (2006.01) |
| F04D 13/06 | (2006.01) |
| F04D 29/12 | (2006.01) |

(Continued)

(52) U.S. Cl.
CPC ............ *F04D 29/108* (2013.01); *F04D 13/06* (2013.01); *F04D 29/046* (2013.01); *F04D 29/10* (2013.01); *F04D 29/106* (2013.01); *F04D 29/12* (2013.01); *F04D 29/126* (2013.01); *F04D 29/128* (2013.01); *F16C 33/741* (2013.01); *F16C 33/743* (2013.01); *F16J 15/32* (2013.01); *F05B 2240/50* (2013.01); *F05B 2240/57* (2013.01)

(58) Field of Classification Search
CPC ...... F04D 29/10; F04D 29/106; F04D 29/108; F04D 29/12; F04D 29/126; F04D 29/128; F04D 29/046; F04D 29/086; F04D 29/061; F16C 33/741; F16C 33/743; F16J 15/32; F16J 15/324; H02K 5/124; H02K 21/16

See application file for complete search history.

(56) References Cited

U.S. PATENT DOCUMENTS 3,681,142 A * 8/1972 Schmitt .................... F16J 15/00
134/42
4,614,444 A * 9/1986 Hines ....................... B62D 1/16
384/138

(Continued)

FOREIGN PATENT DOCUMENTS

DE 102 39 998 A1 3/2004
JP 9-280193 A 10/1997

OTHER PUBLICATIONS

European Search Report received from the Hague Patent Office in related Application No. 19 17 6634.4-1007 dated Oct. 30, 2019.

*Primary Examiner* — Courtney D Heinle
*Assistant Examiner* — Andrew J Marien
(74) *Attorney, Agent, or Firm* — The Marbury Law Group, PLLC

(57) ABSTRACT

A bearing packing according to the invention includes a first packing having an opening portion formed therein, the opening portion allowing a rotary shaft to penetrate through the first packing, and a second packing having an opening portion formed therein, the opening portion allowing the rotary shaft to penetrate through the second packing, and configured to be brought into engagement with the first packing in a direction of the rotary shaft, and a sealed space for sealing a hydrophobic fluid in is defined around a circumference of the rotary shaft that is surrounded by the first packing and the second packing.

10 Claims, 6 Drawing Sheets

(51) Int. Cl.
*F16C 33/74* (2006.01)
*F16J 15/32* (2016.01)

(56) References Cited

U.S. PATENT DOCUMENTS

| | | | | |
|---|---|---|---|---|
| 5,053,661 A * | 10/1991 | Kitamura | ............... | H02K 5/124 |
| | | | | 310/83 |
| 2003/0107184 A1* | 6/2003 | Platner | ................ | F16J 15/3284 |
| | | | | 277/563 |
| 2019/0383303 A1* | 12/2019 | Cho | ........................ | F04D 13/06 |

* cited by examiner

BEARING PACKING AND FEED PUMP

CROSS-REFERENCE TO RELATED APPLICATION

This patent application is based upon and claims the benefit of priority under 35 USC 119 of Japanese Patent Application No. 2018-115729 filed on Jun. 19, 2018, the entire disclosure of which, including the description, claims, drawings, and abstract, is incorporated herein by reference in its entirety.

BACKGROUND OF THE INVENTION

Field of the Invention

The present invention relates to a bearing packing and a feed pump.

Description of the Related Art

Sealing techniques have been proposed heretofore for submersible pumps for raising water. For example, in a submersible pump described in Japanese Unexamined Patent Publication No. 9-280193 (hereinafter, referred to as JP-A-9-280193), an impeller disposed inside a pump casing is attached to a lower end portion of a rotor shaft that penetrates through an axial center portion of a motor disposed inside a head cover, and fluid that flows into the pump casing is discharged upwards by the impeller when it rotates. The rotor shaft is sealed up by a pair of oil seals provided at a lower side of a bearing.

In the sealing structure of the rotor shaft described in JP-A-9-280193, however, it is assumed that sufficient waterproofness cannot be ensured due to fluid leaking from between the rotor shaft and the oil seals.

SUMMARY OF THE INVENTION

The present invention has been made in view of the situations described above, and an object of the present invention is to provide a bearing packing with improved waterproofness and a feed pump with improved waterproofness.

According to an aspect of the invention, there is provided a bearing packing including a first packing having an opening portion formed therein, the opening portion allowing a rotary shaft to penetrate through the first packing, and a second packing having an opening portion formed therein, the opening portion allowing the rotary shaft to penetrate through the second packing, and configured to be brought into engagement with the first packing in a direction of the rotary shaft, wherein a sealed space is defined around a circumference of the rotary shaft that is surrounded by the first packing and the second packing, the sealed space sealing a hydrophobic fluid in.

According to another aspect of the invention, there is provided a feed pump including a first packing having an opening portion formed therein, the opening portion allowing a rotary shaft to penetrate through the first packing, a second packing having an opening portion formed therein, the opening portion allowing the rotary shaft to penetrate through the second packing, and configured to be brought into engagement with the first packing in a direction of the rotary shaft, a motor connected to one end of the rotary shaft, an impeller connected to the other end of the rotary shaft, and a case configured to install the first packing and the second packing, wherein a sealed space is defined around a circumference of the rotary shaft that is surrounded by the first packing and the second packing, the sealed space sealing a hydrophobic fluid in.

According to the invention, the bearing packing with the improved waterproofness and the feed pump with the improved waterproofness can be provided.

DETAILED DESCRIPTION OF THE PREFERRED EMBODIMENT

Figure 1:
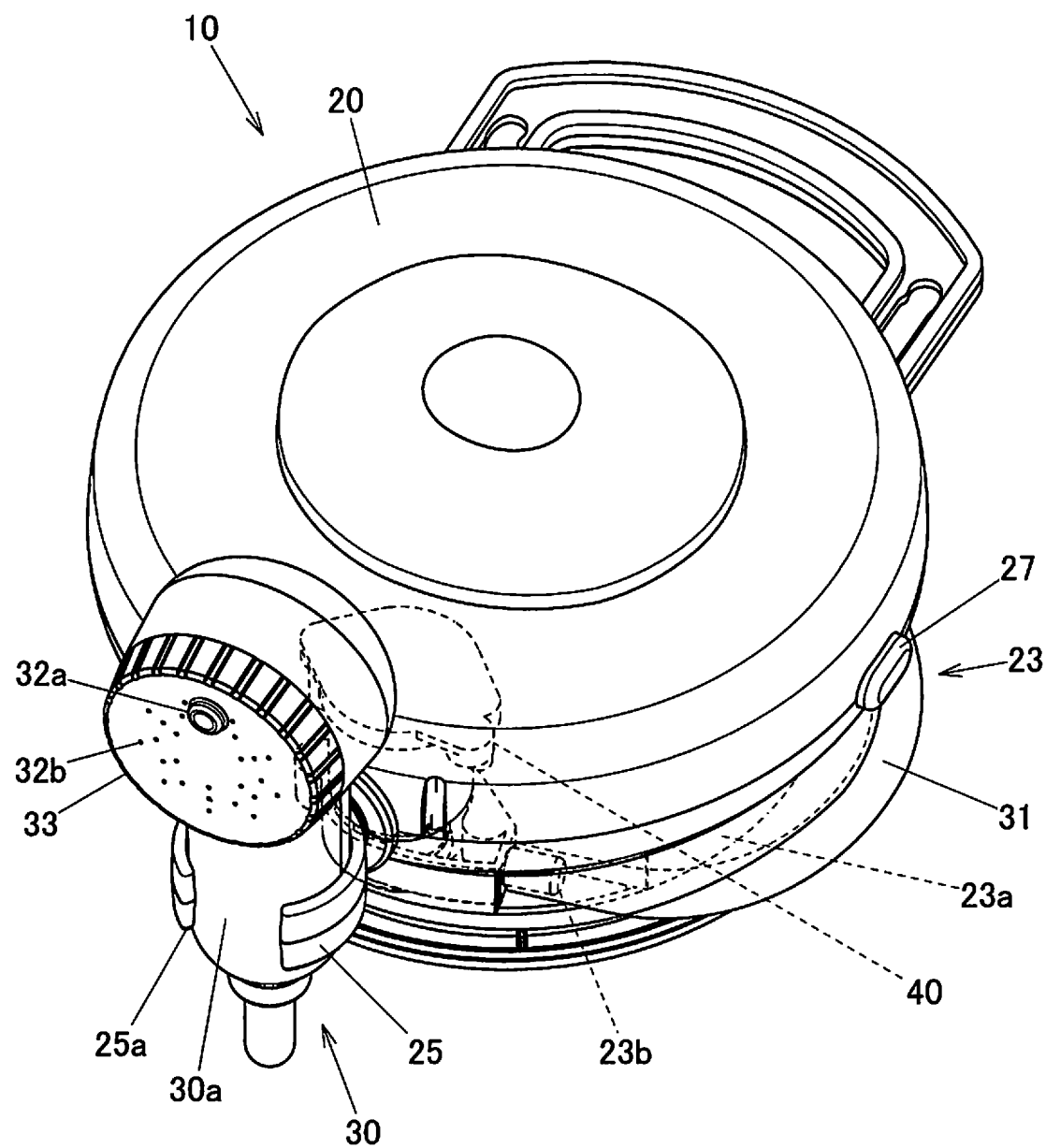
FIG. 1 is a perspective view of a water spraying toy according to an embodiment of the invention, showing a front side of the eater spraying toy.
Figure 2:
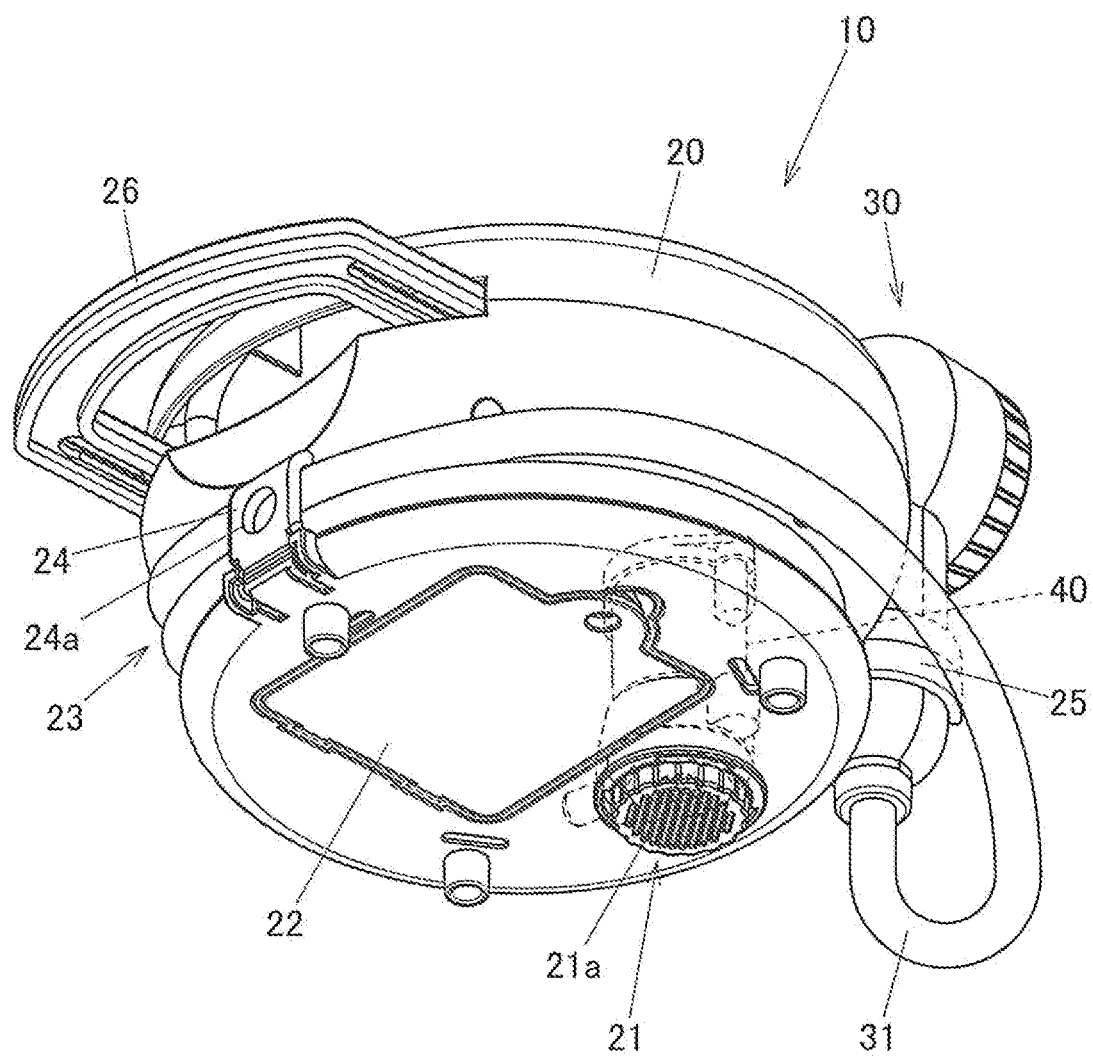
FIG. 2 is a perspective view of the water spraying toy according to the embodiment of the invention, showing a rear side of the water spraying toy.

Hereinafter, an embodiment of the invention will be described. FIG. 1 is a perspective view of a water spraying toy 10 according to an embodiment of the invention, showing a front side of the eater spraying toy 10. FIG. 2 is a perspective view of the water spraying toy 10, showing a rear side of the water spraying toy 10. This water spraying toy 10 is a toy in which a main body unit 20 sucks water while kept floating on a surface of water in a swimming pool for infants or a bathtub and the water so sucked is then sprayed from a shower unit 30. Water is sucked from a bottom surface of the main body unit 20. The shower unit 30 can be attached to and detached from the main body unit 20. A user can play with the water spraying toy 10 by detaching the shower unit 30 from a shower holder 25 on the main body unit 20 to spray water from the shower unit 30 or attaching the shower unit 30 to the shower holder 25 to cause the main body unit 20 to travel on the surface of water.

In the following description, in the water spraying toy 10, a side where the shower holder 25 is provided on the main body unit 20 is referred to as a front of the water spraying toy 10, and an opposite side thereto is referred to as a rear of the water spraying toy 10. In addition, a lower side of FIG. 1 is referred to as a bottom of the water spraying toy 10, and an opposite side thereto is referred to as a top of the water spraying toy 10.

As shown in FIG. 1, the water spraying toy 10 includes the main body unit 20 having a substantially circular shape when seen from above and the shower unit 30 configured to be brought into engagement with the shower holder 25 of the main body unit 20. The main body unit 20 has a hollow structure that is tightly closed. A floating member (not shown) formed of a foamed styrol having a mass density smaller than that of water is installed in an interior of the main body unit 20. The floating member is packed around internal constituent components in such a manner as to fill an interior space of the main body unit 20.

As shown in FIG. 2, the main body unit 20 includes a suction part 21 and a power supply box 22 on the bottom surface thereof. Water is drawn from the suction port 21 by a feed pump 40 provided in the interior of the main body unit 20. The suction port 21 includes a net-like filter 21a at an entrance portion thereof, and foreign matters can be prevented from intruding into the pump 40 by this filter 21a. In this embodiment, the filter 21a is formed integrally with a detachable cover provided at an entrance to the suction port 21. A power supply such as a battery to drive the feed pump 40 is installed in the power supply box 22.

As shown in FIGS. 1 and 2, aside circumferential recess portion 23 is provided on an outer circumferential side surface of the main body unit 20. This side circumferential recess portion 23 is formed as an annular concave groove extending along a full circumference of the main body unit 20. A discharge port 23b of the feed pump 40 installed in the interior of the main body unit 20 is provided on a bottom portion 23a of the concave groove of the side circumferential recess portion 23. One end of a hose 31 is connected to the discharge port 23b, and the other end of the hose 31 is connected to the shower unit 30. Then, the hose 31 can be wound around the side circumferential surface of the main body unit 20 along the bottom portion 23a of the side circumferential recess portion 23. As shown in FIG. 2, the main body unit 20 includes a substantially rectangular hook 24 having an opening hole 24a formed therein, and this hook 24 is provided on the outer circumferential side surface of the main body unit 20 at a rear side thereof. The hook 24 is formed in such a manner as to rotate on a shaft at a proximal end thereof. Then, the hose 31 wound around the side circumferential recess portion 23 is adjusted to an appropriate length and can be fixed to the main body unit 20 by rotating the hook 24 towards the main body unit 20. In addition, a handle 26 is provided retractably at a rear side of the main body unit 20.

As shown in FIG. 1, the shower unit 30 connected to the main body unit 20 via the hose 31 includes a shower switching portion 33 having a plurality of water spraying ports 32a, 32b formed therein on a distal end side thereof. A substantially cylindrical shower main body portion 30a is formed on a side of the shower unit 30 that faces the hose 31. In the shower unit 30, water drawn from the suction port 21 can be sprayed out from either of the spraying ports 32a, 32b by switching the spraying ports 32a, 32b between them by rotating the shower switching portion 33. Thus, in the water spraying toy 10, a spraying distance and a spraying range can arbitrarily be controlled by controlling the shower switching portion 33.

The main body unit 20 includes the shower holder 25 provided on the outer circumferential side surface of the main body unit 20 at a front side thereof. An arm portion 25a, which is formed substantially into a C-shape, is formed at a distal end side of the shower holder 25. In the shower unit 30, the shower main body portion 30a can be brought into engagement with the arm portion 25a inside the arm portion 25a by passing the hose 31 through a cut in the C-shaped arm portion 25a. Consequently, the shower unit 30 can freely be attached to and detached from the shower holder 25. The shower holder 25 is secured with a shaft to the outer circumferential side surface of the main body unit 20, whereby an angle of the arm portion 25a can be controlled horizontally, vertically, or to an in-between position. Consequently, when grasped by the shower holder 25, the shower unit 30 can be fixed at an arbitrary angle that is controlled horizontally, vertically or to an in-between position according to the controlled angle of the shower holder 25.

The main body unit 20 includes a power supply switch 27 on the outer circumferential side surface. The feed pump 40 is driven by turning on the power supply switch 27. In the water spraying toy 10, water is drawn from the suction port 21 connected to one part of the feed pump 40, and the water is sent to the discharge port 23b connected to the other part of the feed pump 40. The water sent to the discharge port 23b passes through an interior of the hose 31 and is then sprayed out from the discharge ports 32a, 32b of the shower unit 30.

Figure 3:
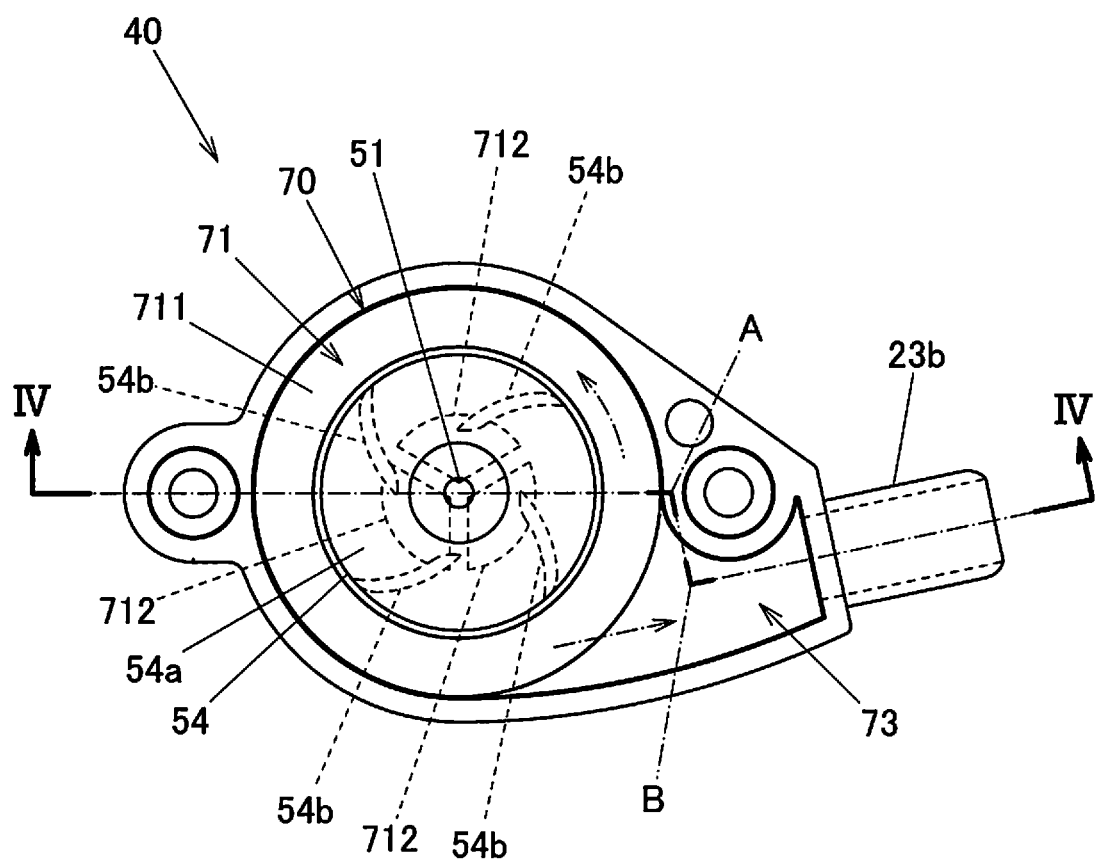
FIG. 3 is a schematic plan view showing an internal structure of a feed pump according to the embodiment of the invention.
Figure 4:
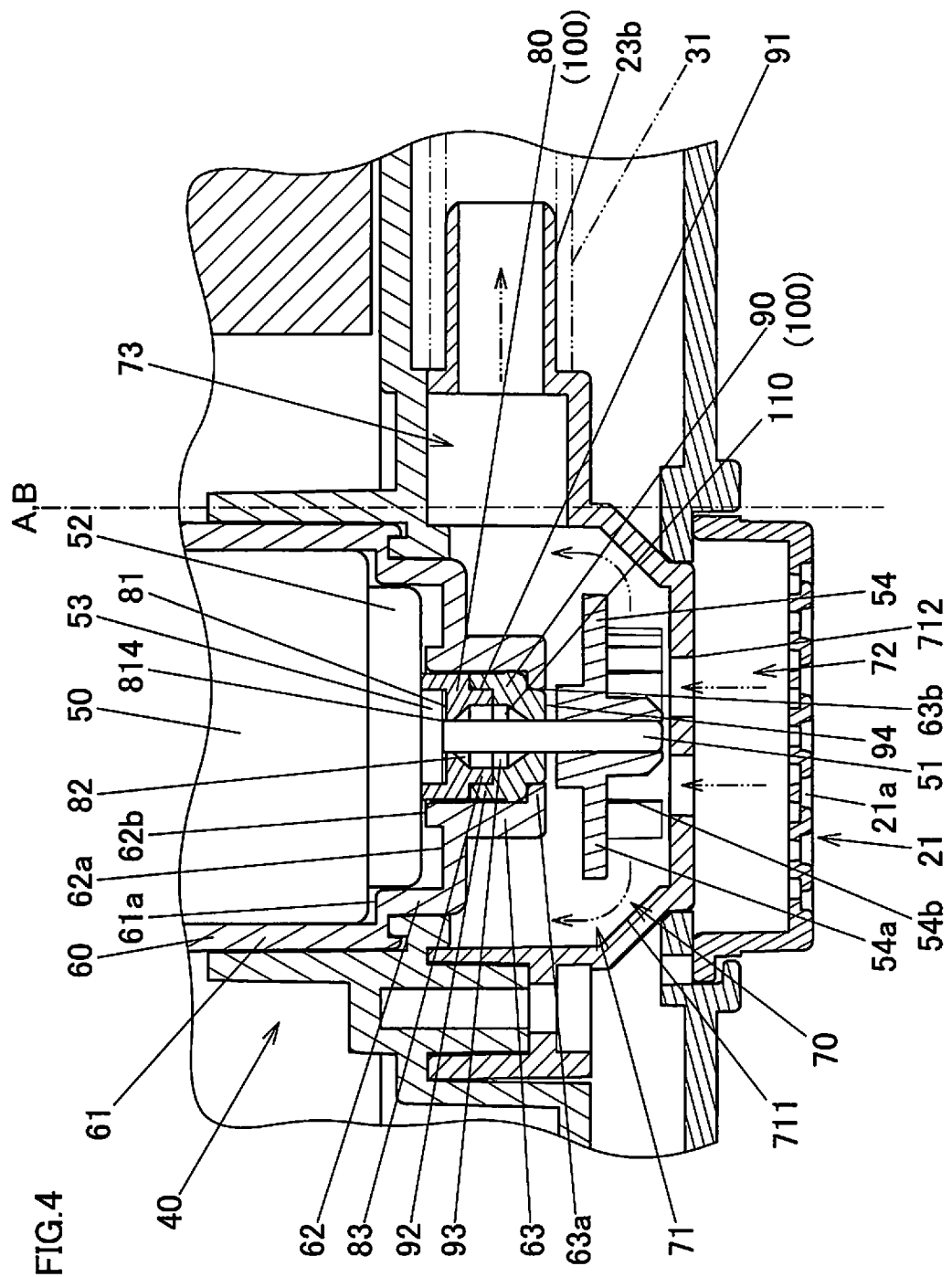
FIG. 4 is a sectional view of the feed pump according to the embodiment of the invention taken along a line IV-IV in FIG. 3.

Next, an internal structure of the feed pump 40 will be described. FIG. 3 is a schematic plan view showing an internal structure of the feed pump 40. FIG. 4 is a sectional view of the feed pump 40 taken along a line IV-IV in FIG. 3. In FIG. 4, the feed pump 40 includes a motor 50, a case 60 where the motor 50 is installed, an impeller 54 configured to be driven to rotate by the motor 50, and a flow path space 70 installing the impeller 54 and the like to define a water channel.

The motor 50 has a substantially cylindrical shape as a whole. FIG. 4 shows a part of a rotary shaft 51 side of the motor 50. The motor 50 includes a protruding portion 52 having a diameter that is smaller than an overall diameter of the motor 50 and formed substantially into a short cylindrical shape at an end portion thereof where the rotary shaft 51 is provided. A bearing protruding portion 53 is formed at an end portion of the protruding portion 52 where the rotary shaft 51 is provided. The bearing protruding portion 53 has a diameter that is much smaller than an outside diameter of the protruding portion 52 and is formed substantially into a short cylindrical shape. The rotary shaft 51 extends downwards from a substantially central position of the bearing protruding portion 53. The impeller 54 is connected to a distal portion of the rotary shaft 51.

The case 60 includes a motor installing portion 61 where to install the motor 50, an intermediate diameter portion 62 where to install the protruding portion 52, and a packing installing portion 63 where to install a bearing packing 100 (a first packing 80 and a second packing 90) that is disposed in such a manner as to cover the bearing protruding portion 53 and the rotary shaft 51. The motor installing portion 61, the intermediate diameter portion 62, and the packing installing portion 63 are each formed into a cylindrical shape. The motor installing portion 61, the intermediate diameter portion 62, and the packing installing portion 63 are each formed as a substantially circular opening portion. Although not shown, the motor installing portion 61 is closed in an upper end position where the motor 50 is installed.

An annular step portion 61a is formed in such a manner as to extend radially inwards from a lower end of the motor installing portion 61. The intermediate diameter portion 62 extends downwards in the direction of the rotary shaft 51 from an inner edge of the step portion 61a. The step portion 61a is formed in such a manner as to be substantially at right angles to the motor installing portion 61 and the intermediate diameter portion 62.

An annular step portion 62a is formed in such a manner as to extend radially inwards from a lower end of the intermediate diameter portion 62. The packing installing portion 63 extends downwards in the direction of the rotary shaft 51 from an inner edge of the step portion 62a. The step portion 62a is formed in such a manner as to be substantially at right angles to the intermediate diameter portion 62 and the packing installing portion 63. A protruding portion 62b is formed at an inner edge of the step portion 62a, and this protruding portion 62b protrudes towards the motor installing portion 61 and has a substantially rectangular cross-sectional shape. The protruding portion 62b is provided annularly at the inner edge of the step portion 62a. An inner circumferential surface of the protruding portion 62b is formed to continue to an inner circumferential surface of the packing installing portion 63. The packing installing portion 63 includes a diametrically contracted portion 63a formed at a lower end portion thereof, and this diametrically contracted portion 63a is contracted diametrically towards the rotary shaft 51. An opening portion 63b is defined by an inner edge of the diametrically contracted portion 63a. The opening portion 63b is formed as a substantially circular through hole having a diameter that is smaller than an inside diameter of the packing installing portion 63.

The flow path space 70 includes an impeller installing portion 71, a suction portion 72, and a discharge portion 73. The impeller installing portion 71 can install part (the intermediate diameter portion 62 and the packing installing portion 63) of the case 60 and the impeller 54. An inner circumferential side surface of the impeller installing portion 71 is formed substantially into a circumferential shape, and an annular inclined surface 711 is provided radially outwards of the impeller 54, and this annular sloping surface 711 has a mortar-like shape. The inclined surface 711 is formed in such a manner as to gradually expand in diameter from bottom to top.

The suction portion 72 is provided below the impeller installing portion 71 where the impeller 54 and the like are installed and extends downwards to thereby be connected to the suction port 21 that includes the filter 21a. The suction portion 72 includes an opening portion 712 connected with the suction port 21 underneath the impeller installing portion 71. A plurality of opening portions 712 are provided as shown in FIG. 3 and are each formed into a fan-like shape in a plan view.

The discharge portion 73 is provided above the impeller 54 and at a side of the impeller installing portion 71 in such a manner as to extend sideways therefrom. The discharge portion 73 includes the discharge port 23b, which is a substantially cylindrical joint, and the discharge port 23b fits in the hose 31.

The impeller 54 includes a substantially circular plate-like base portion 54a and blade portions 54b provided on a lower side of the base portion 54a in such a manner as to extend downwards therefrom. The blade portions 54b are each formed into a slightly curved rectangular plate-like shape and extend in a clockwise direction from a radially inner side to a radially outer side of the base portion 54a as shown in FIG. 3. The impeller 54 rotates in a counterclockwise direction in FIG. 3. As a result, as indicated by chain double-dashed lines in FIG. 4, water is guided radially outwards from near a center of the impeller 54 towards the inclined surface 711. Water directed towards the inclined surface 711 as a result of the rotation of the impeller 54 is guided upwards of the inclined surface 711 while swirling in the counterclockwise direction in FIG. 3 and is then sequentially discharged towards the discharge portion 73 that is provided to extend substantially in a tangential direction of the impeller 54 as indicated by a chain double-dashed line. In this way, the feed pump 40 can feed water fed from the suction portion 72 towards the hose 31.

Figure 5A:
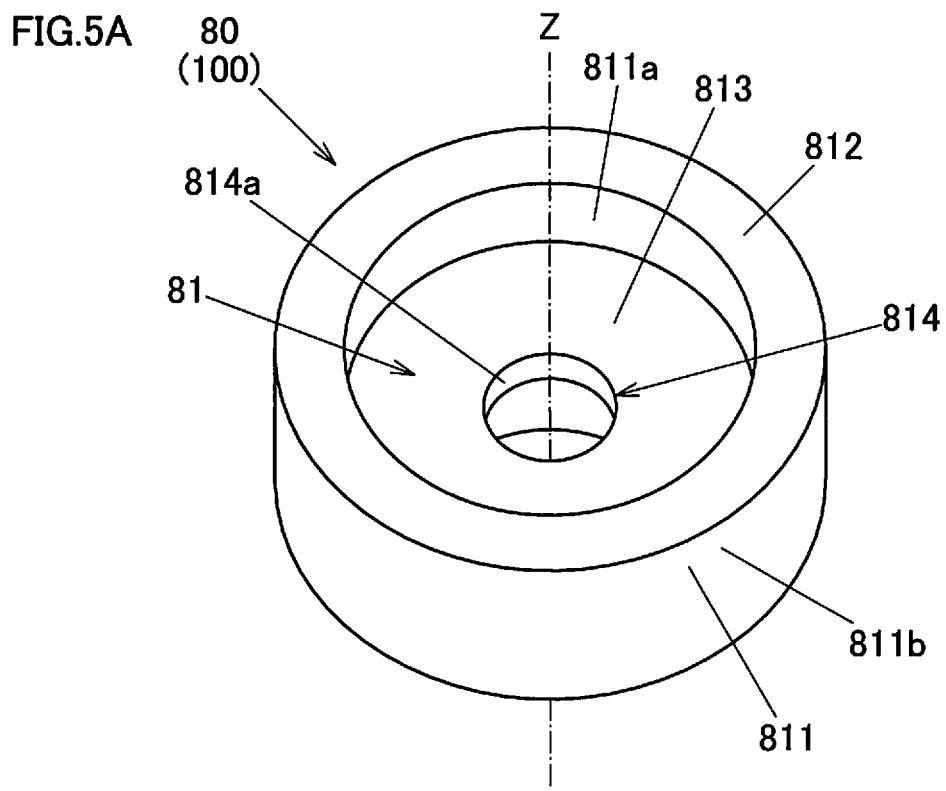
FIG. 5A is a top perspective view of a first packing according to the embodiment of the invention.
Figure 5B:
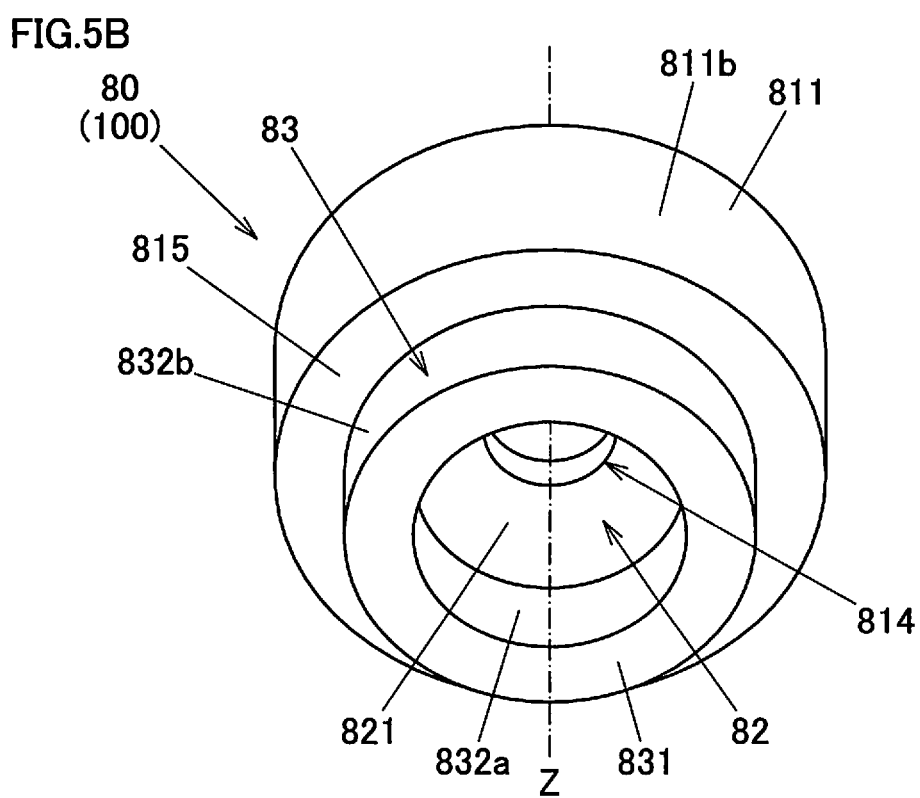
FIG. 5B is a bottom perspective view of the first packing according to the embodiment of the invention.

Next, the configuration of the first packing 80 will be described. FIG. 5A is a top perspective view of the first packing 80, and FIG. 5B is a bottom perspective view of the first packing 80.

The first packing 80 has a substantially cylindrical shape as a whole and is formed of a flexible member such as rubber. The first packing 80 has a substantially circular depression 81 at an end thereof where the motor 50 is disposed and a first installing portion 82 and an engaging portion 83 at an opposite end to the end where the motor 50 is disposed. The depression 81 is formed inside an outer cylindrical portion 811 having a substantially bottomed cylindrical shape. An inner circumferential surface 811a and an outer circumferential surface 811b of the outer cylindrical portion 811 are formed substantially parallel to an axis Z.

An annular distal end face 812 of the outer cylindrical portion 811 and a circular bottom surface 813 of the depression 81 are formed as flat surfaces that are substantially at right angles to the axis Z. A first opening portion 814 having a circular shape is formed substantially at a center of the bottom surface 813 in such a manner as to penetrate the bottom surface 813 vertically. An inner wall 814a of the first opening portion 814 is formed substantially parallel to the axis Z. The first rotary shaft 51 is inserted through the first opening portion 814 (refer to FIG. 4).

The first installing portion 82 is formed inside the engaging portion 83 having a substantially bottomed cylindrical shape. The first opening portion 814 is formed substantially at a center of a bottom surface 821 of the first installing portion 82. The bottom surface 821 is formed substantially into a mortar-like shape and is diametrically reduced from bottom to top.

A distal end face 831 of the engaging portion 83 is formed as an annular flat surface that is substantially at right angles to the axis Z. An inner circumferential surface 832a and an outer circumferential surface 832b of the engaging portion 83 are formed substantially parallel to the axis Z. The outer circumferential surface 832b is formed smaller in diameter than the outer circumferential surface 811b of the outer cylindrical portion 811. As shown in FIG. 4, the outer circumferential surface 832b is formed so as to have substantially the same diameter as that of the inner circumferential surface 811a of the outer cylindrical portion 811. An upper end of the outer circumferential surface 832b and a lower end of the outer circumferential surface 811b are connected to each other via an annular step portion 815. The step portion 815 is also formed as a flat surface that is substantially at right angles to the axis Z.

A boundary portion between the inner circumferential surface 832a and the bottom surface 821 and the step portion 815 are disposed substantially at the same level (also, refer to FIG. 4).

Figure 6A:
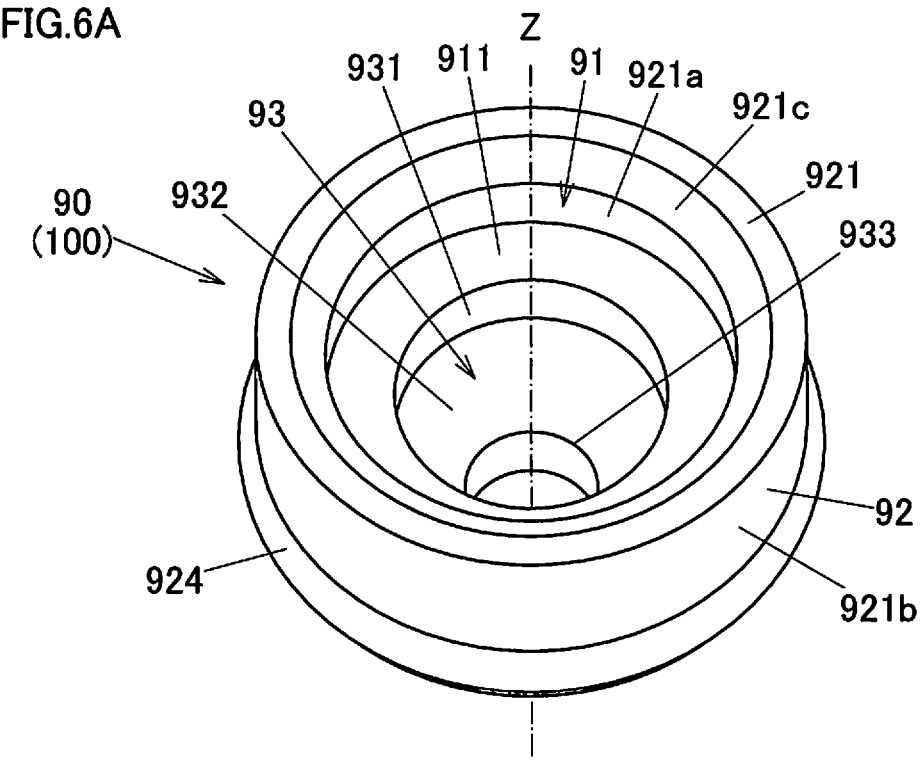
FIG. 6A is a top perspective view of a second packing according to the embodiment of the invention.
Figure 6B:
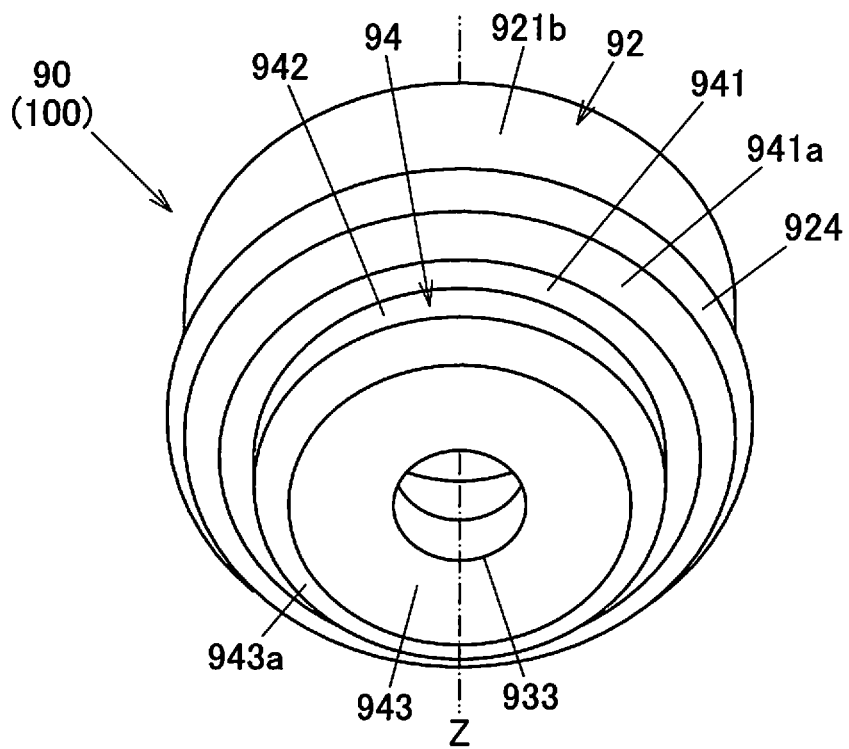
FIG. 6B is a bottom perspective view of the second packing according to the embodiment of the invention.

Next, the configuration of the second packing 90 will be described. FIG. 6A is a top perspective view of the second packing 90, and FIG. 6B is a bottom perspective view of the second packing 90.

The second packing 90 has a substantially cylindrical shape as a whole and is formed of a flexible member such as rubber. The second packing 90 includes an engaged portion 91 and a second installing portion 93 at an end thereof where the first packing 80 is disposed and a substantially circular protruding portion 94 at an opposite end to the end where first packing 80 is disposed.

The engaged portion 91 is formed inside an outer cylindrical portion 92 having a substantially cylindrical shape. A distal end face 921 of the outer cylindrical portion 92 is formed as an annular flat surface that is substantially at right angles to the axis Z. The distal end face 921 includes a tapered portion 921c that is formed by chamfering an inner edge of the distal end face 921 that is connected to an inner circumferential surface 921a. The tapered portion 921c also has an annular shape when seen from above.

The engaged portion 91 includes a second installing portion 93, which takes the form of a circular depression, substantially at a center of a bottom surface 911 formed substantially parallel to the distal end face 921. Consequently, the bottom surface 911 is formed substantially annularly. The second installing portion 93 includes an inner circumferential surface 931 that is substantially parallel to the axis Z and an inclined portion 932, and this inclined portion 932 is formed substantially into a mortar-like shape and is gradually diametrically reduced from top to bottom. A second opening portion 933 is formed substantially at a center of the inclined portion 932, and this second opening portion 933 has a substantially circular shape and penetrates the inclined portion 932 vertically. As shown in FIG. 4, the rotary shaft 51 is inserted through the second opening portion 933.

An outer circumferential projection 924 is formed on an outer circumferential surface 921b of the outer cylindrical portion 92 at a side facing the protruding portion 94, and this outer circumferential projection 924 extends annularly along a full circumference of the outer circumferential surface 921b. The outer circumferential projection 924 has a substantially convex ark-like vertical cross-sectional shape.

The projecting portion 94 has a substantially cylindrical external shape centered at the axis Z. A proximal end of the projecting portion 94 is connected to the outer circumferential projection 924 via a step portion 941 and a tapered portion 941a. The step portion 941 is formed on an outer circumference of the projecting portion 94 as a flat surface that is substantially at right angles to the axis Z. The tapered portion 941a is formed by chamfering an outer circumference of the step portion 941. A distal end face 943 of the projecting portion 94 is formed as a substantially circular flat surface that is substantially at right angles to the axis Z, and the second opening portion 933 is formed near a center of the distal end face 943. A tapered portion 943a is formed by chamfering an outer edge of the distal end face 943.

A boundary portion between the inner circumferential surface 921a and the bottom surface 911 is disposed above the step portion 941 (also, refer to FIG. 4). An upper edge of the second opening portion 933 (in other words, a boundary portion between the second opening portion 933 and the bottom surface 911) is disposed below the step portion 941.

Next, referring to FIGS. 4 to 6, installation of the first packing 80 and the second packing 90 will be described. The outer circumferential surface 832b of the engaging portion 83 has substantially the same diameter as that of the inner circumferential surface 921a of the engaged portion 91. When the engaging portion 83 and the engaged portion 91 are brought into engagement with each other, the bottom surface 911 and the distal end surface 831 are brought into abutment with each other, and the distal end face 921 and the step portion 815 are brought into abutment with each other. Since the inner circumferential surface 832a of the engaging portion 83 has substantially the same diameter as that of the inner circumferential surface 931 of the second installing portion 93, when the first packing 80 and the second packing 90 are brought into engagement with each other, the inner circumferential surfaces (the inner circumferential surfaces 832a, 931) of the first installing portion 82 and the second installing portion 93 are connected together so as to continue to each other.

In bringing the engaging portion 83 of the first packing 80 into engagement with the engaged portion 91 of the second packing 90, a distal end of the engaging portion 83 is guided by the tapered portion 921c provided on the outer cylindrical portion 92 of the second packing 90, whereby the engaging portion 83 and the engaged portion 91 can easily be brought into engagement with each other in the direction of the axis Z.

Since the outer circumferential surface 811b of the first packing 80 has substantially the same diameter as that of the outer circumferential surface 921b of the second packing 90, when the first packing 80 and the second packing 90 are brought into engagement with each other, the outer circumferential surface 811b and the outer circumferential surface 921b are connected to together so as to continue to each other. The outer circumferential surface 811b and the outer circumferential surface 921b have the diameters that are slightly smaller than an inside diameter of the packing installing portion 63, but a maximum outside diameter of the outer circumferential projection 924 is slightly greater than the inside diameter of the packing installing portion 63. As a result, when the first packing 80 and the second packing 90 are installed within the packing installing portion 63 as shown in FIG. 4, the outer circumferential projection 924 is pressed against to be narrowed radially inwards by the inner circumferential surface of the packing installing portion 63. As a result, a gap between the second packing 90 and the packing installing portion 63 is sealed up.

The distal end face 812 of the outer cylindrical portion 811 is pressed downwards by the protruding portion 52 of the motor 50. As a result, a lower surface of the protruding portion 52 and the distal end face 812 of the first packing 80 can be brought into press contact with each other in a sealed fashion. The diametrically contracted portion 63a supports the second packing 90 from below, and the step portion 941 of the second packing 90 comes substantially into face-to-face abutment with a circumferential edge of the opening portion 63b. As a result, a space in the impeller installing portion 71 that is defined below and radially outwards of the opening portion 63b can be sealed up from a space in the packing installing portion 63 that is defined above and radially inwards of the opening portion 63b.

As shown in FIG. 4, with the first packing 80 and the second packing 90 installed in the packing installing portion 63, the rotary shaft 51 is inserted through the first opening portion 814 and the second opening portion 933. When the first packing 80 and the second packing 90 are brought into engagement with each other and the rotary shaft 51 is inserted through the individual opening portions 814, 933, a sealed space 110 is defined on a circumference of the rotary shaft 51 that is surrounded by the first installing portion 82 and the second installing portion 93. In this embodiment, a hydrophobic fluid such as grease is packed in the sealed space 110. Thus, even though water intrudes from between the rotary shaft 51 and the second opening portion 933 due to a hydraulic pressure generated in the impeller installing portion 71 or the like, the leaking water can be prevented from intruding further into the second installing portion 93. In this way, with the bearing packing 100 in which the first packing 80 and the second packing 90 are brought into engagement with each other in the direction of the rotary shaft 51 and the feed pump 40 using the bearing packing 100 therein, the waterproofness can be improved.

Thus, while the embodiment of the invention has been described heretofore, the invention is not limited by the embodiment, and hence, the invention can be carried out in various modes. For example, a configuration may be adopted in which the first packing 80 has an engaged portion in the form of a depression, while the second packing 90 has an engaging portion that is brought into engagement with the engaged portion, whereby the first packing 80 and the second packing 90 are brought into engagement with each other in the direction of the rotary shaft 51.

What is claimed is:

1. A bearing packing, comprising:
    a first packing having a first opening portion formed therein, wherein the first opening portion is configured to have a rotary shaft penetrate there through; and
    a second packing having a second opening portion formed therein, wherein the second opening portion is configured to have the rotary shaft penetrate there through from a distal end of the first packing through the second packing to a fluid channel beyond a distal end of the second packing,
    wherein the first packing comprises a first cylindrical engaging portion provided on a side of the first packing that faces the second packing,
    wherein the second packing comprises a second cylindrical engaging portion provided on a side of the second packing that faces the first packing, wherein the second cylindrical engaging portion is configured to be brought into engagement with the first cylindrical engaging portion to form a sealed space that encloses a portion of the rotary shaft along with a hydrophobic fluid therein,
    space that encloses a portion of the rotary shaft along with a hydrophobic fluid therein.

2. The bearing packing according to claim 1,
    wherein the sealed space is defined by a first installing portion of the first packing and a second installing portion of the second packing, the first installing portion being opened at a side of the first packing that faces the second packing, the second installing portion being opened at a side of the second packing that faces the first packing.

3. The bearing packing according to claim 1,
    wherein the first packing comprises an outer circumferential projection provided to extend along a circumferential direction thereof.

4. A feed pump, comprising:
    a first packing having a first opening portion formed therein, wherein the first opening portion is configured to have a rotary shaft penetrate there through;
    a second packing having a second opening portion formed therein, wherein the second opening portion is configured to have the rotary shaft penetrate there through from a distal end of the first packing through the second packing to a fluid channel beyond a distal end of the second packing;
    a motor configured to be connected to one end of the rotary shaft;
    an impeller configured to be connected to the other end of the rotary shaft; and
    a case configured to install the first packing and the second packing,
    wherein the first packing comprises a first cylindrical engaging portion provided on a side of the first packing that faces the second packing,
    wherein the second packing comprises a second cylindrical engaging portion provided on a side of the second packing that faces the first packing, wherein the second cylindrical engaging portion is configured to be brought into engagement with the first cylindrical engaging portion to form a sealed space that encloses a portion of the rotary shaft along with a hydrophobic fluid therein.

5. The feed pump according to claim 4, wherein the case comprises:
    a packing installing portion configured to install the first packing and the second packing therein; and
    a diametrically contracted portion configured to support the first packing from a distal end of the rotary shaft, the diametrically contracted portion being diametrically contracted in a direction of the rotary shaft.

6. The bearing packing according to claim 2,
    wherein the first packing comprises an outer circumferential projection provided to extend along a circumferential direction thereof.

7. The bearing packing according to claim 4, wherein the first packing has a depression on the motor side for installing a part of the motor.

8. The bearing packing according to claim 7,
    wherein the first packing comprises an outer circumferential projection provided to extend along a circumferential direction thereof.

9. The bearing packing according to claim 5, wherein the first packing has a depression on the motor side for installing a part of the motor.

10. The bearing packing according to claim 9,
    wherein the first packing comprises an outer circumferential projection provided to extend along a circumferential direction thereof.

* * * * *